(12) United States Patent
Liu et al.

(10) Patent No.: US 8,443,194 B2
(45) Date of Patent: May 14, 2013

(54) METHOD OF AUTHENTICATION AND SESSION KEY AGREEMENT FOR SECURE DATA TRANSMISSION, A METHOD FOR SECURELY TRANSMITTING DATA, AND AN ELECTRONIC DATA TRANSMISSION SYSTEM

(75) Inventors: Fuwen Liu, Cottbus (DE); Hartmut Koenig, Dresden (DE)

(73) Assignee: Brandenburgische Technische Universität Cottbus (DE)

( * ) Notice: Subject to any disclaimer, the term of this patent is extended or adjusted under 35 U.S.C. 154(b) by 42 days.

(21) Appl. No.: 13/252,234

(22) Filed: Oct. 4, 2011

(65) Prior Publication Data

US 2012/0082312 A1 Apr. 5, 2012

(30) Foreign Application Priority Data

Oct. 5, 2010 (EP) .................................... 10186598

(51) Int. Cl.
*H04L 9/32* (2006.01)
*H04L 9/00* (2006.01)
*H04K 1/00* (2006.01)

(52) U.S. Cl.
USPC ........... 713/169; 713/168; 713/170; 713/171; 713/176; 380/28; 380/260; 380/262; 380/268

(58) Field of Classification Search ............. 713/168, 713/169, 170, 171, 176; 380/28, 260, 262, 380/268
See application file for complete search history.

(56) References Cited

PUBLICATIONS

Franks et al: HTTP Authentication: Basic and Digest Access Authentication. RFC 2617, Jun. 1999, 34 pages.
Kohl et al.: The Kerberos Network Authentication Service (V5). RFC 1510, Sep. 1993, 113 pages.
Wu: A Real-World Analysis of Kerberos Password Security. Proceedings of the ISOC Symposium on Network and Distributed System Security, 1999, 10 pages.
Burr et al.: Electronic Authentication Guideline. Recommendations of the National Institute of Standards and Technology, NIST Special publication 800-63, Apr. 2006, 64 pages.
Bellovin et al.: Encrypted Key Exchange: Password based Protocols Secure against Dictionary Attacks. Proceedings of the IEEE Symposium on Research in Security and Privacy, May 1992, 13 pages.
Wu: The Secure Remote Password Protocol Proceedings of the 1998 Internet Society Network and Distributed System Security Symposium, San Diego, Mar. 1998, 15 pages.
Kwon: Authentication and Key Agreement via Memorable Password. NDSS 2001 Symposium Conference Proceedings, Feb. 2001, 13 pages.
MacKenzie: The PAK Suite: Protocols for Password-Authenticated Key Exchange. DIMACS Technical Report 002-46, Oct. 2002, 58 pages.
Jablon: Strong Password-Only Authenticated Key Exchange. Computer Communication Review, ACM SIGCOMM, vol. 26, No. 5, Oct. 1996, 22 pages.

(Continued)

*Primary Examiner* — Mohammad W Reza
(74) *Attorney, Agent, or Firm* — Schmeiser, Olsen & Watts, LLP

(57) ABSTRACT

The invention relates to a method of authentication and session key agreement for secure data transmission between a first and second data communication entity in an electronic data transmission system. Furthermore, the invention relates to an electronic transmission system to perform a method of authentication and session key agreement.

5 Claims, 1 Drawing Sheet

PUBLICATIONS

Hao et al.: Password Authenticated Key Exchange by Juggling. Proceedings of the 16th International Workshop on Security Protocols, 2008, 12 pages.

Patel: Number theoretic attacks on secure password schemes. Proceedings of the IEEE Symposium on Security and Privacy, May 1997, 12 pages.

Patel: Information Leakage in Encrypted Key Exchange. Proceedings of the DIMACS Workshop on Network Threats, 1997, 3 pages.

Van Oorschot et al.: On Diffe-Hellman Key Agreement with Short Exponents. Proceedings of Eurocrypt'96, LNCS 1070, Springer, pp. 332-343, May 1996.

NIST (National Institute of Standards and Technology): Advanced Encryption Standard (AES). Processing Standards Publication 197, Nov. 2001, 51 pages.

NIST (National Institute of Standards and Technology): Recommendation for Key Management—Part 1: General. Special Publication 800-57, Mar. 2007, 142 pages.

IEEE Computer Society P1363.2: Standard Specifications for Password-Based Public-Key Cryptographic Techniques. Jan. 2009, 2 pages.

C. Boyd et al: Elliptic Curve Based Password Authenticated Key Exchange Protocols. ACISP 2001: LNCS 2119, 15 pages.

M. Zhang: Analysis of the SPEKE password-authenticated key exchange protocol. IEEE Communications Letters, vol. 8, No. 1, Jan. 2004, 1 page.

C. Boyd et al.: Protocols for Authentication and Key Establishment. Springer-Verlag, 2003, 1 page.

A.J. Menezes et al: Handbook of applied cryptography, CRC Press series on discrete mathematics and its applications. CRC Press, 1997, 1 page.

NIST (National Institute of Standards and Technology): Recommendation for Pair-Wise Key Establishment Schemes Using Discrete Logarithm Cryptography. Special Publication 800-56A, Mar. 2007, 114 pages.

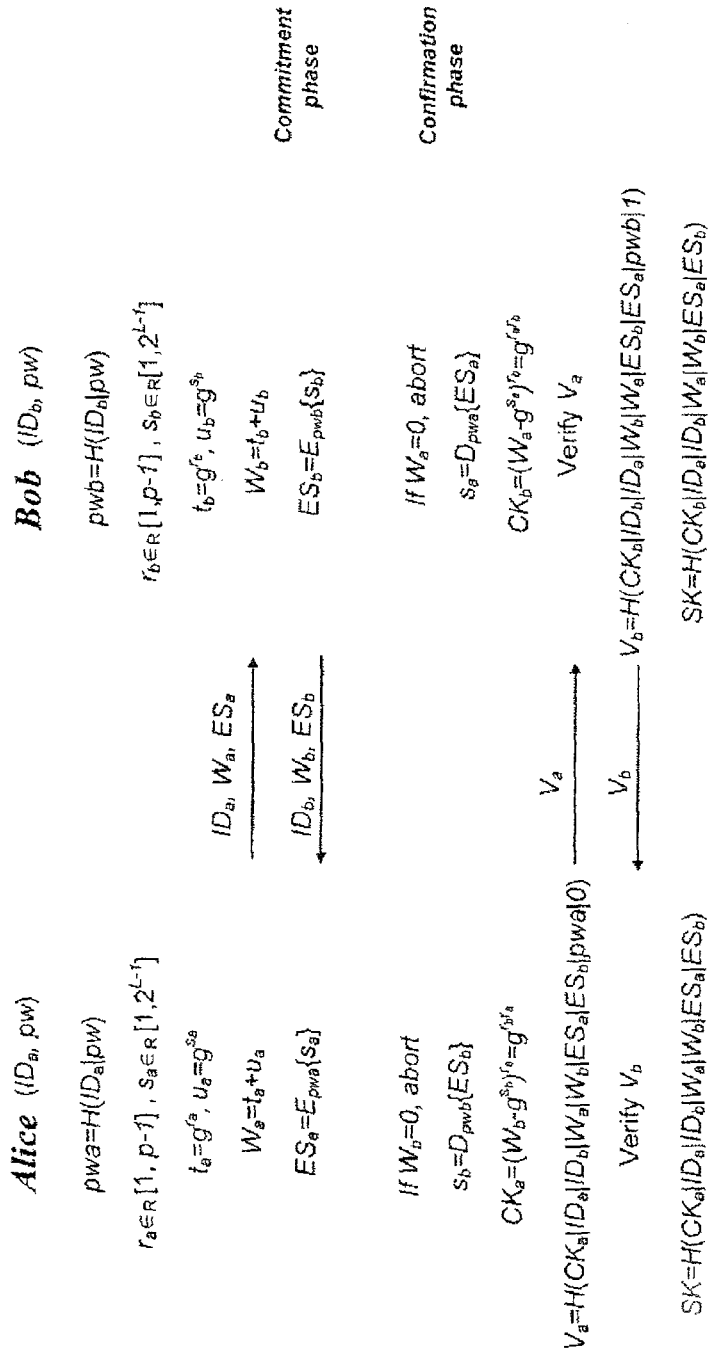

METHOD OF AUTHENTICATION AND SESSION KEY AGREEMENT FOR SECURE DATA TRANSMISSION, A METHOD FOR SECURELY TRANSMITTING DATA, AND AN ELECTRONIC DATA TRANSMISSION SYSTEM

FIELD OF TECHNOLOGY

The present application refers to a method of authentication and session key agreement for secure data transmission between a first and a second data communication entity in an electronic data transmission system. Further, the application refers to a method for securely transmitting data, and an electronic data transmission system.

BACKGROUND

Password authentication protocols have been broadly deployed in client/server communication settings for its convenient usage and low costs of deployment. Nowadays peer-to-peer networks become increasingly popular, where the role of principals is symmetric (balanced), i.e. each principal acts not only as a client but also as a server.

Entity authentication that verifies the legitimacy of communication partners is indispensable for a secure communication. Basically there are two approaches for this in the network setting: relying on a PKI or using passwords. Usually the latter is preferred in practice, since authentication can be simply performed by using the human-memorable passwords without requiring the investment on the expensive PKI. Classic password authentication protocols, such as HTTP digest authentication protocol (Franks et al: HTTP Authentication: Basic and Digest Access Authentication. RFC 2617, June 1999) and Kerberos (Kohl et al.: The Kerberos Network Authentication Service (V5). RFC 1510, September 1993), are designed on the basis of the challenge-response mechanism, where the server presents the client a challenge (randomly-generated number), and the client responses to the server with a valid answer which is generated by encrypting the challenge with the password or hashing the challenge in conjunction with the password.

Although passwords are not transmitted in a clear form over the insecure network, an adversary is still able to acquire the correct password by using a special variant of the brute-force attack: the off-line dictionary attack (see Franks et al: HTTP Authentication: Basic and Digest Access Authentication. RFC 2617, June 1999; Wu: A Real-World Analysis of Kerberos Password Security. Proceedings of the ISOC Symposium on Network and Distributed System Security, 1999). This is due to the low entropy of a human-chosen password. The length of passwords mostly used in practice is rarely longer than 8 characters. It has merely about 30 bits of entropy ($2^{30}$) if the password is chosen by human (Burr et al.: Electronic Authentication Guideline. NIST Special publication 800-63, April 2006). Accordingly, the attacker can recover the password in a reasonable time from the recorded transcripts of a password authentication protocol.

There is password-based protocol, namely DH-EKE ("Diffie-Hellman Encrypted Key Exchange") protocol (Bellovin et al.: Encrypted Key Exchange: Password-based Protocols Secure against Dictionary Attacks. Proceedings of the IEEE Symposium on Research in Security and Privacy, May 1992), proposed to foil off-line dictionary attacks. Its basic idea is that two parties exchange ephemeral DH public keys encrypted with a shared password. Only the parties who know the password are able to agree upon a session key for securing the communication. The protocol addresses a problem that seems to be intractable in the past: the establishment of a cryptographically strong session key from a shared short secret with low entropy.

Inspired by the DH-EKE protocol, numerous password-based authentication key agreement protocols have been developed, most of which follow the principle of DH-EKE protocol. They are distinguished in two categories: augmented and balanced password-authenticated key agreement protocols. The augmented password-authenticated key agreement protocols are mainly used in client/server settings, where the client (user) knows the password, whilst the server possesses only the password verifiers for authenticating clients. The SRP ("Secure Remote Password") protocol (Wu: The Secure Remote Password Protocol. Proceedings of the 1998 Internet Society Network and Distributed System Security Symposium, San Diego, March 1998, pp. 97-111) and AMP ("Authentication via Memorable Password") protocol (Kwon: Authentication and Key Agreement via Memorable Password. NDSS 2001 Symposium Conference Proceedings, February 2001) are typical examples.

The balanced password-authenticated key agreement (BPAKA) protocol is a symmetric authentication scheme, where both parties know a common password and negotiate a shared session key after the successful mutual authentication by using the password. This protocol is well suited for symmetric communication settings, where the roles of the principals are balanced like in peer-to-peer (P2P) communication, wireless mesh networks, and wireless ad-hoc networks. There are several representative protocols in this category. They are DH-EKE protocol, PAK ("Password Authenticated Key exchange") protocol (MacKenzie: The PAK Suite: Protocols for Password-Authenticated Key Exchange DIMACS Technical Report 002-46, October 2002), SPEKE ("Secure Password Exponential Key Exchange") protocol (Jablon: Strong Password-Only Authenticated Key Exchange Computer Communication Review, ACM SIGCOMM, vol. 26, no. 5, pp. 5-26, October 1996), as well as the newcomer J-PAKE (Hao et al.: Password Authenticated Key Exchange by Juggling. Proceedings of the 16th International Workshop on Security Protocols, 2008).

The DH-EKE protocol first demonstrated that it is feasible to withstand off-line dictionary attacks in an authenticated key agreement protocol. This has been achieved by symmetrically encrypting the exchanged DH public keys with the shared password. The only difference between the DH-EKE protocol and the basic Diffie-Hellman protocol is that the exchanged DH public keys are encrypted in the DH-EKE protocol with the password, whilst in the basic DH protocol they are not. The encryption of the exchanged DH public keys serves two purposes. First it provides an authentication function in the sense that only the parties who know the password can correctly decrypt the DH public keys and generate the session key according to the basic DH principle. Secondly it can foil off-line dictionary attacks because an attacker is unable to ascertain whether the decryption results are valid messages, when decrypting the encrypted DH public keys using a guessed password. However, as shown in (Patel: Number theoretic attacks on secure password schemes. Proceedings of the IEEE Symposium on Security and Privacy, May 1997; Patel: Information Leakage in Encrypted Key Exchange. Proceedings of the DIMACS Workshop on Network Threats, 1997), the DH-EKE protocol suffers from partition attacks due to information leakage. Assume that a DH public key $g^x$ mod p is encrypted with a password, where p is a prime number encoded with n bits so that $p \leq 2^n - 1$. An attacker can mount partition attacks to rule out the guessing password candidates which are used for decrypting the DH public keys, when the decryption results fall into the range [p, $2^n-1$]. To decrease the possibility of a partition attack, p should be slightly less than a power of 2, and a certain number of the most significant bits of p are set one. This implies that the domain parameters have to be carefully chosen in the discrete logarithm (DL) groups and specific finite groups needed to be defined. Another limitation of DH-EKE is that the use of the short exponents makes the scheme insecure (Hao: Password Authenticated Key Exchange by Juggling. Proceedings of the 16th International Workshop on Security Protocols, 2008). This makes the protocol much more inefficient than those protocols that can utilize short exponents.

Although the DH-EKE protocol has several security weaknesses and performance limitations, it creates a new concept to realize the password authentication key agreement protocol. This concept is generalized as follows: the parties can mutually authenticate each other and agree upon a shared key through exchanging the password-entangled public keys The protocol SPEKE ("secure password exponential key exchange") instantiates the DH-EKE concept using a password-driven variable as generator of the public keys instead of a fixed one as in the basic DH protocol. However, such method allows an active attacker to test multiple passwords in one run of the protocol because some passwords are exponentially equivalent. It may become more serious that an attacker is possible to recover the password if the password is a Personal Identification Number (PIN). Like the DH-EKE protocol, the SPEKE protocol has to use long exponents (Hao: Password Authenticated Key Exchange by Juggling. Proceedings of the 16th International Workshop on Security Protocols, 2008). The password authenticated key (PAK) exchange protocol is another scheme following the generic concept. It employs the multiplication operation in the DL group to replace the symmetric encryption operation used in the DH-EKE protocol. The DH public keys in the PAK protocol are multiplied with a password-driven group element rather than are encrypted with a password before they are exchanged. The short exponents can be applied to the generation of the DH public keys in the PAK protocol. But an exponentiation with the long exponent is needed to convert the hash value of the password into the DL group element. This calculation is more expensive than the subsequent DH exchange computation.

Recently a new solution to the password authenticated key exchange called J-PAKE (Password Authenticated Key Exchange by Juggling) was proposed (Hao: Password Authenticated Key Exchange by Juggling. Proceedings of the 16th International Workshop on Security Protocols, 2008). Its design concept is completely different from the past password authenticated key exchange protocols. The J-PAKE protocol works like a juggling game between two players if we view a public key as a "ball". In round one, each player throws two balls (ephemeral public keys) to each other. In round two, each player forms a new ball by combining the available public keys and the password, and throws it to each other. After that, two parties can compute a common session key if the same password is provided in the calculation of the session key. The J-PAKE imposes no constraints on the choice of finite groups and use of the short exponents. But the performance of the J-PAKE is merely comparable to that of the aforementioned protocols (DH-EKE, SPEKE, and PAK) because it needs 14 exponentiations using short exponents in each party to complete the protocol, whilst the previous protocols requires only two exponentiations with long exponents.

It is well-known that security protocols are difficult to design because they have to fulfill numerous security requirements and simultaneously to be efficient. They should possess the following security properties: key authentication, known-key security, forward secrecy, off-line dictionary at-tack resistance, partition attack resistance, on-line dictionary attack resistance. Although several BPAKA protocols are available, their weaknesses in terms of security and efficiency are gradually disclosed.

SUMMARY

It is an object of the invention to provide improved technologies, preferably, applicable to authentication and session key agreement for secure data transmission in an electronic data transmission system.

According to an aspect of the invention, a method of authentication and session key agreement for secure data transmission between a first and second data communication entity in an electronic data transmission system according to the independent claim 1 is provided. Further, a method for securely transmitting data according to claim 4, and an electronic data transmission system according to claim 5 are provided. Advantageous developments of the invention are disclosed in dependent claims.

By the invention, a robust and simple password authentication protocol is provided, since PKIs ("Public Key Infrastructures") are not always available for authentication. The simple password-authenticated key agreement protocol may be used in peer-to-peer communication. It fulfils the security requirements on the password authentication protocols, and is resilient to passive and active attacks as well as dictionary attacks. The proposed scheme is more efficient than the well established protocols due to its simple design concept.

In a preferred embodiment, as the encryption algorithm an AES (AES—"Advanced Encryption Standard") encryption is used.

In still another preferred embodiment, in the electronic data transmission system data are exchanged over a wireless data connection between the first and the second data communication entity.

Components and/or modules for implementing features of the technology proposed may provided by software and/or hardware. For example, certain features of the technology may be implemented by software application modules comprising program code configured to, when loaded into a processing device, perform steps of the respective method. In conclusion, a computer program product may be provided, comprising program instructions which when executed cause a processor to perform steps of the method proposed in one of the embodiments.

BRIEF DESCRIPTION

FIG. 1 shows a schematic representation of the procedure of a method of authentication and session key agreement for secure data transmission between a first and second data communication entity in an electronic data transmission system.

DESCRIPTION

Following the invention will be described in further detail, by way of example, with reference to certain embodiments.

There are security requirements related to password-based authentication key agreement protocols.

Like other security protocols, the password-based authentication key agreement protocols are prone to passive and active attacks from the network. An adversary attempts to derive the useful information (e.g. passwords) from the recorded transcripts of a protocol (passive attacks). Alternatively, an adversary tries to prevent a protocol from achieving its goal by impersonating the communication partner or modifying the messages transmitted over the network (active attacks).

There exists a special attack against password protocols, called dictionary attack, where the attacker wants to determine the correct password from a relatively small dictionary containing frequently used passwords. It can be further distinguished between on-line and off-line dictionary attacks. In an on-line dictionary attack, the adversary picks a password from the dictionary and initiates the protocol with an honest entity. If the protocol terminates abnormally he/she can ascertain that the guessed password is incorrect. This attack is trivial to prevent by limiting the number of failed runs of the protocol. In contrast, the off-line dictionary attack is difficult to detect and foil because the adversary just passively eavesdrops the protocol messages and searches for a password matching in the recorded communication. There is a special variant of the off-line dictionary attack, called partition attack (Bellovin: Encrypted Key Exchange: Password-based Protocols Secure against Dictionary Attacks. Proceedings of the IEEE Symposium on Research in Security and Privacy, May 1992), where an attacker can partition the password space into a valid part and an invalid part by analyzing the captured protocol messages.

To mitigate the above mentioned attacks the password-based authentication key agreement protocols should meet the following security requirements:

Key authentication: The agreed session key is known only to the mutually trusted parties.

Known-key security: The disclosure of past session keys will not help the adversary to get the future session keys and to derive the password.

Forward secrecy: A compromised password does not affect the secrecy of previous session keys.

Off-line dictionary attack resistance: The adversary can not perform the off-line exhaustive search of the password by using the eavesdropped messages of one or more sessions.

Partition attack resistance: The adversary can not eliminate a significant number of possible passwords with each protocol run.

On-line dictionary attack resistance: Ideally the active adversary can eliminate only one password per protocol run.

In general, the robustness of password based authentication key agreement protocols to a great extend relies on mathematically hard problems in the working group as well as the security strength of the used cryptographic functions. The security assumptions of the method proposed here are detailed as follows.

In a certain embodiment, the method proposed here is performed over a finite cyclic group G with the large prime order p, i.e. $G=\{g^r \mod p: 1 \leq r < p\}$, where p is a safe prime to defend against the Pohling-Hellman attacks (van Oorschot et al.: On Diffie-Hellman Key Agreement with Short Exponents. Proceedings of Eurocrypt'96, LNCS 1070, Springer, pp. 332-343, May 1996), g is a primitive root modulo p in the G so that for any $x \in [1, p-1]$, there always exists a value r to meet the formula $g^r \mod p = x$. Usually $g^r \mod p$ and r are called public key and private key, respectively, in the DH key agreement protocol. For simplicity, $g^r \mod p$ is expressed as $g^r$ in the rest of the paper. In the group G the security of the method proposed here depends on the hardness of the discrete logarithm problem (DLP) and the computational Diffie-Hellman (CDH) problem. Given the domain parameters (g, p) and the public key $g^r$, it is computationally infeasible to find the private key r (DLP problem). Knowing the domain parameters and exchanged public keys $g^{ra}$ and $g^{rb}$, an attacker cannot compute the shared secret $g^{rarb}$ (CDH problem).

The method proposed here applies the symmetric encryption function $E_k(r)=C$ to encrypting the random number r, where k and r are the inputted key and plaintext, respectively, and C represents the output (i.e. ciphertext) of the function E. The symmetric encryption function is usually treated as a random permutation. It should be secure against the ciphertext only attacks at least. In other words, an adversary cannot deduce k and r from the known ciphertext C. Basically all standard block ciphers meet this requirement. The standard AES algorithm (NIST: ADVANCED ENCRYPTION STANDARD (AES). Processing Standards Publication 197, November 2001) is used in the protocol provided in the present application.

The method proposed, in a certain embodiment, employs a cryptographic strong hash function $H(m)=h$ to compute the verification tag and session key, where m is the message as input and h is the output of the function. The hash function H should possess the following features. Knowing a hash value h, it is computationally infeasible to find any message m such that $h=H(m)$ (pre-image resistance). Given an input $m_1$, it is computationally infeasible to find another message $m_2 \neq m_1$ such that $H(m_1)=H(m_2)$ (second pre-image resistance). It is computationally infeasible to find two different message $m_1$ and $m_2$ such that $H(m_1)=H(m_2)$ (Collision resistance).

Following, for certain embodiments of the method proposed here principles and procedures are introduced.

Two parties exchange password-masked public keys to authenticate each other and agree upon a session key for securing their communication. At the beginning each party generates two kinds of private keys: a temporary private key and a shadow private key, and correspondingly computes the respective temporary and shadow public key. The shadow public key is used to mask the temporary public key in the protocol. This is achieved by computing the modular sum of both public keys. The computing result is called password-masked public key. The temporary public key is not bound to the password, while the shadow public key is indirectly connected to the password because the shadow private key is encrypted with the password. After exchanging the password-masked public keys and the encrypted shadow private keys, each party can obtain the communicating partner's temporary public key by subtracting the shadow public key from the received password-masked public key. Each party performs the modular exponentiation operation to derive the shared session key by using the recovered temporary public key and its own temporary private key.

A difference between the method proposed here and the previous password protocols discussed above is that the method proposed here exchanges the password-masked public keys instead of the password-entangled public keys. In the known protocols, the password directly manipulates the public keys: public keys are encrypted with the password in the DH-EKE protocol; password derived group elements multiply with the public keys in the PAK protocol; and password derived elements are used as the generator (base) of the public keys in the SPEKE protocol. On the contrary, in the method proposed here the password does not manipulate the exchanged public keys directly. It is used for only encrypting the private key associated with the shadow public key. In this way, the proposed method can avoid the possible partition attacks.

Referring the only FIGURE, there two phases: a commitment and a confirmation phase. In the commitment phase both parties exchange the password-masked public keys and the shadow private keys encrypted with the password in order to generate the shared secret. In the confirmation phase both parties exchange the verification data and validate the received verification data to confirm that the communication partner knows the password.

Assume that Alice with the identity $ID_a$ and Bob with the identity $ID_b$ are engaged in the protocol. They know a common password pw used for authentication and the DL domain parameters (g, p). The procedure of the method proposed here is detailed as follows.

First, there is a commitment phase as follows.

In a certain embodiment, Alice initiates the protocol and computes the symmetric encryption key pwa using the hash function H(pw| $ID_a$), where | denotes a message concatenation.

Then, Alice generates two random numbers $r_a \in_R [1,p-1]$ and $s_a \in_R [1, 2^{L-1}]$ which are denoted as the temporary and the shadow private key, respectively, and L is the block size of the AES encryption. Accordingly, she computes the temporary public key $t_a = g^{r_a}$, and the shadow public key $u_a = g^{s_a}$. Further she makes a modular sum of the temporary public key and shadow public key to get the password-masked public key $W_a = t_a + u_a$.

Following, Alice encrypts the shadow private key $s_a$ with the key pwa using AES, i.e. $ES_a = E_{pwa}\{s_a\}$. Finally she sends the commitment message which consists of $ID_a$, $W_a$, and $ES_a$ to Bob.

After receiving Alice's commitment message, Bob forms his commitment message in the same way as Alice did and sends it as acknowledgement to Alice.

Following, the confirmation phase is described.

In a certain embodiment, upon receipt of Bob's commitment message, Alice first checks whether $W_b$ is equivalent to zero or not. If $W_b=0$, Alice aborts the procedure of the protocol. This can prevent a dictionary attack that may be launched by an adversary impersonating Bob. If $W_b \neq 0$, she decrypts the $ES_b$ with the key pwb, and gets the Bob's shadow private key $s_b$.

Then, Alice computes the Bob's shadow public key $g^{sb}$, and calculates the common confirmation key $CK_a = (W_{b-g}{}^{sb})^{r_a} = g^{r_b r_a}$ using her private key $r_a$. Then she generates the tag $V_a = H(CK_a|ID_a|ID_b|W_a|W_b|ES_a|ES_b|pwa|0)$, and sends it to Bob. The verification tag $V_a$ ensures that the messages exchanged between Alice and Bob are not altered in transition and proofs that Alice knows the password and the confirmation key $g^{r_b r_a}$ simultaneously.

Bob computes the common confirmation key $CK_b = g^{r_a r_b}$ like Alice does. To check the received verification tag Va, the tag $V_a' = H(CK_b|ID_a|ID_b|W_a|W_b|ES_a|ES_b|pwa|0)$ is computed. If $V_a' = V_a$ he ensures that Alice knows the password pw as well as the shared secret $g^{r_a r_b}$ the exchanged messages in the committing phase are not altered during transition. Bob yields the verification tag $V_b = H(CK_b|ID_b|ID_a|W_b|W_a|ES_b|ES_a|pwb|1)$ and delivers it to Alice. Finally Bob computes the shared session key $SK = H(CK_b|ID_a|ID_b|W_a|W_b|ES_a|ES_b)$.

After receiving the verification tag $V_b$, Alice checks its validity like Bob did. If the check passes Alice yields the shared key $SK = H(CK_a|ID_a|ID_b|W_a|W_b|ES_a|ES_b)$.

Note that Alice and Bob apply different keys (i.e. pwa, pwb) to encrypt the shadow private key in the committing phase, and the verification tags $V_a$ and $V_b$ in the confirming phase are not symmetric. So the possible reflection attacks can be prevented.

In the following a security analysis is discussed. Especially, it is examined whether the method proposed here fulfills the security requirements on the password protocols that are introduced above.

Key Authentication

Only the participants who know the password can compute the shared session key SK. This is ensured by exchanging and checking the verification tags $V_a$ and $V_b$ between Alice and Bob in the confirming phase of the protocol. The generation of $V_a$ and $V_b$ requires the knowledge of both the common confirmation key CK and the password. The possibility to construct the correct verification tags $V_a$ and $V_b$ without knowing CK and the password is negligible. We assume that an adversary named Eve sitting in the middle of Alice and Bob wants to talk to them separately using the forged verification tags $V_a'$ and $V_b'$. It is trivial for Alice and Bob to detect this attack by checking the received verification tag. So the method proposed here ensures that only the trusted parties are able to gain access to the shared session key.

Known-Key Security

The shared session key SK is generated by hashing the common key CK as well as the messages exchanged in the commit phase. The common key CK is a shared DH secret which is determined by the random values $r_a$ and $r_b$ contributed by Alice and Bob, respectively. The values of $r_a$ and $r_b$ vary from session to session. Consequently, the common key CK is distinguished for each session. This implies that the generation of one session key is independent of other sessions. So the disclosure of past session keys has no impact on the security of the future session keys. Further a compromised session key SK does not help an attacker to deduce the password. With SK, the attacker is unable to gain access to the common key CK due to the one-way property of the hash function H. So an attacker has no way to determine whether a guessed password is valid or not by observing the verification tags $V_a$ and $V_b$, since they contain two unknown components, i.e. CK and password, to the attacker. The method proposed here is therefore resistant to known-key attacks.

Forward Secrecy

A compromised password allows an adversary to recover the past temporary public keys $t_a$ and $t_b$. However he/she is unable to obtain the past temporary private keys $r_a$ and $r_b$ due to the hardness of the DLP problem, and compute the past common key CK due to the intractable CDH problem in the DL field. Thus, the attacker cannot recover the past session key SK without knowing the past common key CK.

Off-Line Dictionary Attack Resistance

The messages exchanged in the protocol are usually available to an eavesdropper, including user's identity ID, password-masked public key W, encrypted shadow private key ES, and verification tag V. From ES, an attacker cannot derive the password, and recover the shadow private keys $s_a$ and $s_b$ according to the assumption to the encryption function E. Based on W, an attacker cannot determined the correct temporary public keys $t_a$ and $t_b$ because they are shielded in the public key W using the shadow public keys $u_a$ and $u_b$, respectively. Moreover, the temporary private keys $r_a$ and $r_b$ are secrets to the eavesdropper. He/she is therefore unable to compute the common key CK. Without the knowledge of CK, the eavesdropper cannot deduce the password from the verification tag V. So the method proposed here withstands off-line dictionary attacks.

Partition Attack Resistance

Password-masked public key W and encrypted shadow private key ES exchanged in the protocol leak no information to attackers. ES is the output of encrypting the shadow private key s that is uniformly distributed in $[1, 2^{L-1}]$. It should be still uniformly distributed in $[1, 2^{L-1}]$, since we assume that the encryption function is a random permutation. The attacker therefore cannot exclude any password when decrypting ES. An attacker may obtain a candidate temporary public key t' by modular subtracting W with a guessing shadow public key u' that is computed in a way that g is raised to the result of decrypting ES with a guessing password pw', i.e. $t' = W - u' = W - g^{Dpw'\{ES\}}$. The value of t' ranges in $[1, p-1]$ since all operations (addition, substraction and exponentiation) are performed modulo p. So t' is always a valid public key since there is an integer r such that $g^r \mod p = t'$ when g is primitive root modulo p in the DL group. In other words, the attacker can not eliminate any password from the password dictionary with the candidate temporary public key t'. Thus partition attacks are infeasible to the method proposed here.

On-Line Dictionary Attack Resistance

An adversary launches on-line dictionary attacks by running the protocol with an honest party using a guessed password. Each time the active adversary can eliminate one password. The attack itself is not a great threat to the use of the protocol, since such active attack is trivial to detect in the confirming phase by checking the verification tags. But, it may lead to the disclosure of the password, when the attacker further mounts the off-line dictionary attack by using the known protocol messages acquired in the on-line dictionary attack. The protocol should guard against this complex attack which combines the on-line and off-line dictionary attacks. In an active attack, the honest party Alice or Bob may be impersonated by the attacker Eve. Who is impersonated is not a concern in the security analysis due to the symmetric nature of the method proposed here. Here we assume Bob is impersonated by Eve and Alice is an honest party. Eve acts the same as Bob except that she applies a guessed password pw' in the protocol. After running the protocol, Eve knows the following information from Alice: identity $ID_a$, password-masked public key $W_a$, encrypted shadow private key $ES_a$, and verification tag $V_a$. Eve can derive the correct password pw by comparing the verification tag $V_a$ if the value of $CK_a$ is known to her. Eve knows $CK_a \neq CK_b$ as $pw' \neq pw$, but she knows the way how $CK_a$ is computed:

$$CK_a = (W_b - g^{sb})^{ra}$$

In this formula, Eve knows $W_b$ and $s_b$, but she cannot compute $CK_a$, since the value $r_a$ is secret to her. Moreover, it is computationally infeasible to guess the correct value $r_a$ since it is a large random number. Without the knowledge of $CK_a$, Eve is unable to mount the off-line dictionary attacks. Thus the method proposed here is resistant against the attacks that combine on-line and off-line dictionary attacks.

The above discussions show that the method proposed is a robust password authentication protocol. It ensures that passwords and shared session keys are not disclosed to an adversary under various kinds of attacks Following, a comparison between the method proposed here and the known protocols with respect to efficiency is presented.

It is well known that the computational cost of password-based authentication protocols is usually dominated by the exponentiation operations. So it only needs to account the number of the exponentiation operations when comparing the method proposed here with the well-known protocols introduced above with respect to the computational complexity.

Assume that two parties want to agree up a 128-bit symmetric key used for a communication session, the prime modulus p has to be at least 3072-bit long as required in the NIST standard (NIST: Recommendation for Key Management—Part 1: General. Special Publication 800-57, March, 2007). If a short exponent is allowed to be applied in the protocol its length should be longer than 256 bits (van Oorschot et al.: On Diffie-Hellman Key Agreement with Short Exponents. Proceedings of Eurocrypt'96, LNCS 1070, Springer, pp. 332-343, May 1996). A 384-bit long exponent is applied in the method proposed here for a fair comparison, since the PAK protocol requires the length of the exponent should be at least 384 bits (MacKenzie: The PAK Suite: Protocols for Password-Authenticated Key Exchange. DIMACS Technical Report 002-46, October 2002) for agreeing upon a 128-bit symmetric key. In the method proposed here, the length of the tiny exponent is fixed to 128 bits because the dictionary space of the password pw is usually less than $2^{30}$. The following table shows the computational cost of the method proposed here and other four compared protocols for each communicating party.

TABLE 1

| | | | Computational lost | | |
|---|---|---|---|---|---|
| Protocol | 128-bit EXP. | 384-bit EXP. | 2698-bit EXP. | 3072-bit EXP. | Total cost (No. of 384-bit EXP.) |
| Method proposed | 2 | 2 | | | 2.66 |
| DH-EKE | | | | 2 | 16 |
| SPEKE | | | | 2 | 16 |
| PAK | | 2 | 1 | | 10 |
| J-PAKE | | 14 | | | 14 |

Note:
EXP. is the abbreviation of exponentiation.

As shown in Table 1, the method proposed here is most efficient among all compared protocols with respect to the total computational cost. Note that we convert the total computational cost into the number of the 384-bit exponentiation for a clear comparison. So a 3072-bit exponentiation is equivalent to eight 384-bit exponentiations. Such conversion is reasonable, since the cost of exponentiation is linear with the bit-length of the exponent. The DH-EKE and SPEKE protocol are the most expensive ones, since they require a full length exponent rather than a short exponent when performing an exponentiation operation. Although there are only two 384-bit exponentiations needed for the generation of the password-entangled public key and compute the shared session key in the PAK protocol, a 2698-bit exponentiation has to be performed to force the hash value of the password to be in the DL group. Thus, the PAK protocol is not as efficient as expected.

A secure and simple password authentication protocol which may also be referred to as SPAKA is provided for use in symmetric communication scenarios, such as in wireless mesh networks and ad-hoc networks. It has demonstrated that the computational overhead of the method proposed here is lower than that of several known protocols. The security analysis has shown the method proposed here is robust to defend against the commonly-known attacks on password authentication protocols.

The features disclosed in this specification, the FIGURE and/or the claims may be material for the realization of the invention in its various embodiments, taken in isolation or in various combinations thereof.

The invention claimed is:

1. A method of authentication and session key agreement for secure data transmission between a first data communication entity and a second data communication entity in an electronic data transmission system, the method comprising:

in a commitment phase in both the first data communication entity and the second data communication entity, providing a password pw, and parameters g, p, and q with $G=\{g^r \bmod p: 1 \leq r < p\}$, where G is a finite cyclic group with a large prime order p, g is a primitive root modulo p in G so that, for any $x Y [1, p-1]$, there always exists a value r to meet the formula $g^r \bmod p = x$;

in the first data communication entity,
generating a first symmetric encryption key by applying a hash function to the password: $pwa = H(pw|ID_a)$, wherein $ID_a$ is an identity of a first user using the first data communication entity;
generating a first temporary private key $r_a \epsilon_R [1, p-1]$ and a first shadow private key $s_a \epsilon_R [1, 2^{L-1}]$, where L is a block size of an encryption algorithm;
generating a first temporary public key $t_a = g^{r_a}$ and a first shadow public $u_a = g^{s_a}$;
generating a first modular sum: $W_a = t_a + u_a$;
encrypting the first shadow private key with the first symmetric encryption key using the encryption algorithm: $ES_a = E_{pwa}\{s_a\}$; and
transmitting the identity of the first user, the first modular sum, and the encrypted first shadow private key from the first data communication entity to the second data communication entity over a communication channel provided in the electronic data transmission system;

in the second data communication entity,
generating a second symmetric encryption key by applying the hash function to the password: $pwb = H(pw|ID_b)$, wherein $ID_b$ is an identity of a second user using the second data communication entity;
generating a second temporary private key $r_b \epsilon_R [1, p-1]$ and a second shadow private key $s_b \epsilon_R [1, 2^{L-1}]$, where L is a block size of the encryption algorithm;
generating a second temporary public key $t_b = g^{r_b}$ and a second shadow public $u_b = g^{s_b}$;
generating a second modular sum: $W_b = t_b + u_b$;
encrypting the second shadow private key with the second symmetric encryption key using an AES encryption: $ES_b = E_{pwb}\{s_b\}$; and
transmitting the identity of the second user, the second modular sum, and the encrypted second shadow private key from the second data communication entity to the first data communication entity over the communication channel provided in the electronic data transmission system; and in a confirmation phase,
in the first data communication entity,
if for the second modular sum $W_b \neq 0$, decrypting the second shadow private key by using the second symmetric encryption key: $s_b = D_{pwb}\{ES_b\}$;
generating a first confirmation key by using the following formula: $CK_a = (W_b - g^{s_b})_{r_a} = g^{r_b r_a}$;
generating a first verification tag: $V_a = H(CK_a | ID_a | ID_b | W_a | W_b | ES_a | ES_b | pwa | 0)$; and
transmitting the first verification tag from the first data communication entity to the second data communication entity over the communication channel provided in the electronic data transmission system, and in the second data communication entity,
verifying the first verification tag;
decrypting the first shadow private key by using the first temporary private key: $s_a = D_{pwa}\{ES_a\}$;
generating a second confirm key by using the following formula: $CK_b = (W_a - g^{s_a})^{r_b} = g^{r_a r_b}$;
generating a second verification tag: $V_b = H(CK_b | ID_a | ID_b | W_a | W_b | ES_a | ES_b | pwb | 1)$; and
transmitting the second verification tag from the second data communication entity to the first data communication entity over the communication channel provided in the electronic data transmission system, and in the first data communication entity, verifying the second verification tag; and
generating a shared session key in the first and second data communication entity: $SK = H(CK_a | ID_a | ID_b | W_a | W_b | ES_a | ES_b)$ and $SK = H(CK_b | ID_a | ID_b | W_a | W_b | ES_a | ES_b)$.

2. The method according to claim 1, wherein the encryption algorithm is an AES encryption.

3. The method according to claim 1, wherein in the electronic data transmission system, data are exchanged over a wireless data connection between the first data communication entity and the second data communication entity.

4. A method of securely transmitting electronic data between a first data communication entity and a second data communication entity in an electronic data transmission system, the method comprising:
providing a data transmission channel between the first data communication entity and the second data communication entity in the electronic data transmission system,
performing an authentication and a session key agreement for secure data transmission between the first data communication entity and the second data communication entity according to the method of claim 1; and
transmitting electronic data between the first data communication entity and the second data communication entity using a shared session key in the first and second data communication entities.

5. An electronic data transmission system, comprising:
a first data communication entity;
a second data communication entity; and
a data transmission channel connecting the first a data communication entity and the second data communication entity;
wherein the first data communication entity and the second data communication entity are configured, by at least one of software and hardware modules, to perform an authentication and a session key agreement for secure data transmission according to the method in claim 1.

* * * * *